US012186925B2

(12) United States Patent
Joosten et al.

(10) Patent No.: US 12,186,925 B2
(45) Date of Patent: Jan. 7, 2025

(54) SHAVING APPARATUS WITH AN ADJUSTABLE SETTING

(71) Applicant: KONINKLIJKE PHILIPS N.V., Eindhoven (NL)

(72) Inventors: Willem Joosten, Wildervank (NL); Geert-Jan Darwinkel, Winsum (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 179 days.

(21) Appl. No.: 17/791,380

(22) PCT Filed: Jan. 11, 2021

(86) PCT No.: PCT/EP2021/050324
§ 371 (c)(1),
(2) Date: Jul. 7, 2022

(87) PCT Pub. No.: WO2021/144205
PCT Pub. Date: Jul. 22, 2021

(65) Prior Publication Data

US 2023/0029552 A1 Feb. 2, 2023

(30) Foreign Application Priority Data

Jan. 14, 2020 (EP) .................................... 20151690

(51) Int. Cl.
*B26B 19/14* (2006.01)
*B26B 19/38* (2006.01)

(52) U.S. Cl.
CPC .......... *B26B 19/145* (2013.01); *B26B 19/386* (2013.01); *B26B 19/388* (2013.01)

(58) Field of Classification Search
CPC ..... B26B 19/14; B26B 19/386; B26B 19/145; B26B 19/28; B26B 19/32; B26B 19/146; B26B 19/063
See application file for complete search history.

(56) References Cited

U.S. PATENT DOCUMENTS 3,233,323 A 2/1966 Josef
3,844,033 A * 10/1974 Yonkers .................. B26B 19/14
30/346.51

(Continued)

FOREIGN PATENT DOCUMENTS

CN 2647519 Y * 10/2004
CN 110303526 A * 10/2019 ........... B26B 19/042

(Continued)

OTHER PUBLICATIONS

International Search Report and Written Opinion Dated May 4, 2021 For International Application No. PCT/EP2021/050324 Filed Jan. 11, 2021.

(Continued)

*Primary Examiner* — Jennifer S Matthews

(57) ABSTRACT

A shaving apparatus (1) having a first shaving unit portion (7) connected to a main housing (2) and accommodating a single driven input member (9) rotatable about an axis of rotation. A second shaving unit portion (8) of the shaving apparatus has a hair-cutting unit (12) and a drive unit (13) which transmits a driving force from the single driven input member to an internal cutting member (19) of the hair-cutting unit. The second shaving unit portion is manually rotatable relative to the first shaving unit portion about the axis of rotation of the single driven input member. An adjustment system (24) has a sensing unit (28, 29) configured to have an output property which varies with the angular position of the second shaving unit portion relative to the first shaving unit portion about the rotational axis. The adjustment system adjusts an operational parameter of the shaving apparatus in dependence on the output property of the sensing unit.

11 Claims, 5 Drawing Sheets

(56) References Cited

U.S. PATENT DOCUMENTS

| | | | | |
|---|---|---|---|---|
| 4,038,747 | A | | 8/1977 | Upton |
| 4,926,550 | A | | 5/1990 | Geertsma |
| 7,152,324 | B2 | | 12/2006 | Uchiyama |
| 7,743,508 | B2 | | 6/2010 | Shimizu |
| 8,397,388 | B1 | | 3/2013 | Steinberg |
| 8,838,232 | B1 | | 9/2014 | Schwerin |
| 9,144,912 | B2 | * | 9/2015 | Marut ..................... B26B 19/06 |
| 10,195,751 | B2 | * | 2/2019 | Shimizu ................ B26B 19/145 |
| 2008/0134513 | A1 | * | 6/2008 | Oh .......................... B26B 19/28 30/43.6 |
| 2018/0178400 | A1 | | 6/2018 | Smal |

FOREIGN PATENT DOCUMENTS

| | | | | |
|---|---|---|---|---|
| EP | 0176128 | A1 | | 4/1986 |
| EP | 0484795 | A1 | * | 5/1992 |

OTHER PUBLICATIONS

KEBOR—Hair Clippers Set for Men, Kebor Electric Cordless LED Display Titanium Ceramic Blade Haircut Kit with Charging Stand and Oil, Rechargeable Lithium-ion Battery Beard Trimmer Wireless PC1010 https://www.amazon.co.uk/dp/B07FSGLHYS/ref=sspa_dk_detail_7?bsc=1&pd_rd_i=B07FSGLHYS&pd_rd_w=BAtWm&pf_rd_p=8e5be0e3-b258-4b0%E2%80%A6.

* cited by examiner

SHAVING APPARATUS WITH AN ADJUSTABLE SETTING

CROSS REFERENCE TO RELATED APPLICATIONS

This application is the U.S. National Phase application under 35 U.S.C. § 371 of International Application No. PCT/EP2021/050324 filed Jan. 11, 2021, which claims the benefit of European Patent Application Number 20151690.3 filed Jan. 14, 2020. These applications are hereby incorporated by reference herein.

FIELD OF THE INVENTION

The invention relates to a shaving apparatus having a main housing accommodating a motor and a driving output member coupled to the motor, a shaving unit including a first shaving unit portion and a second shaving unit portion, and an adjustment system configured to adjust an operational parameter of the shaving apparatus. In such a shaving apparatus, the first shaving unit portion is connected to the main housing in a stationary position relative to the main housing and accommodates a single driven input member which is connected to the driving output member and rotatable about an axis of rotation, and the second shaving unit portion includes a support structure, at least one hair-cutting unit supported by the support structure, and a drive unit connected to the single driven input member and to the hair-cutting unit. The hair-cutting unit includes an external cutting member with hair-entry apertures and an internal cutting member which is movable relative to the external cutting member. The drive unit is arranged to transmit a driving force from the single driven input member to the internal cutting member.

BACKGROUND OF THE INVENTION

From U.S. Pat. No. 4,926,550, a shaving apparatus is known in which the normal force with which the external cutting member is applied to the skin to be shaved depends on the extent to which the external cutting member is pressed inwards against the action of a resilient element. This normal force has its maximum value if the shaving unit is maximally pressed-in. The resilient element of each cutting unit is rotatable by means of a flexible adjustment band in a groove in a wall of a holder of the shaving unit for adjusting the maximum normal force. The flexible band engages the resilient element of the cutting units for adjusting the resilient elements in unison and has a tab extending through an opening in the wall of the holder of the shaving unit. Operating this tab requires the tab to be displaced in longitudinal direction of the flexible band against frictional resistance of the band in the groove, which requires, on the one hand, a substantial force to be exerted onto a small operating member and, on the other hand, precise positioning of the tab in accordance with the desired setting, which makes adjusting the setting a somewhat clumsy operation. Also, shaving debris can easily enter the shaving unit through the opening through which the tab projects and cannot easily be removed from the groove.

U.S. Pat. No. 7,743,508 discloses a shaver of which an operational parameter can be set using a thumb wheel partially projecting from an opening in a wall of the housing. Such a thumb wheel can easily be operated inadvertently when holding the shaver by gripping the housing and shaving debris can easily enter the shaving unit through the opening through which the thumb wheel projects and cannot easily be removed from the housing.

U.S. Pat. No. 8,838,232 discloses a shaver of which an operational parameter can be set using a sliding switch projecting from an opening in a wall of the housing. Such a sliding switch can easily be operated inadvertently when holding the shaver by gripping the housing and shaving debris can easily enter the shaving unit through the opening through which the switch projects and cannot easily be removed from the housing.

A commercially available hair clipper designated as Kebor PC1010 has a housing with a cylindrical portion of which a part remote from a clipper unit can be rotated relative to a part carrying the clipper unit about a central axis of the cylindrical portion for setting the cutting length. Between the mutually rotatable housing parts a seam is present which requires extensive, slidable sealing to avoid that hairs, liquid and dust can enter the housing.

SUMMARY OF THE INVENTION

It is an object of the invention to provide a shaving apparatus of the type as described here before in the section Field of the Invention, wherein an operational parameter of the shaving apparatus can be adjusted by means of a large, easily operable operating member, without adding, for this purpose, a disturbance, such as a seam or a switch, which would distract from a clean, uncluttered design.

To achieve this object, a shaving apparatus according to the invention is characterized in that the first and the second shaving unit portions are mutually connected by means of a connection mechanism which is configured to allow manual rotation of the second shaving unit portion relative to the first shaving unit portion about a rotational axis coinciding with the axis of rotation of the single driven input member, wherein the adjustment system comprises a sensing unit which is configured to have an output property which varies in dependence on an angular position of the second shaving unit portion relative to the first shaving unit portion about the rotational axis, and wherein the adjustment system is configured to adjust the operational parameter in dependence on the output property of the sensing unit.

Thus, according to the invention, the adjustment system is operable by rotating the second shaving unit portion relative to the first shaving unit portion and the main housing about a rotational axis coinciding with the axis of rotation of the single driven input member. This allows adjusting the operational parameter of the shaving apparatus without interfering with the functionality of the drive train from the motor in the main housing to the internal cutting members in the second shaving unit portion. Since the shaving unit is a distinct unit separate from main housing, and rotation of the second shaving unit portion relative to the first shaving unit portion and the main housing is provided about the rotational axis coinciding with the axis of rotation of the single driven input member, setting of the operational parameter of the shaving apparatus is allowed without requiring, for this purpose, an additional seam in the main housing or an operating member such as a switch.

The operational parameter to be adjusted may for instance be a parameter affecting the shaving result, such as a force at which or a distance over which the external cutting member of the hair-cutting unit is urged outwardly of an adjacent skin-supporting surface of the hair-cutting unit. However, the operational parameter may also be another parameter of operation of the shaving apparatus, such as motor speed, a rate at which a shaving cream or other liquid agent, if any, is dispensed or an amount of illumination of the skin adjacent to the shaving apparatus, if any.

Particular elaborations and embodiments of the invention are set forth in the dependent claims.

Further features, effects and details of the invention appear from the detailed description and the drawings.

DETAILED DESCRIPTION OF THE EMBODIMENTS

Figure 1A:
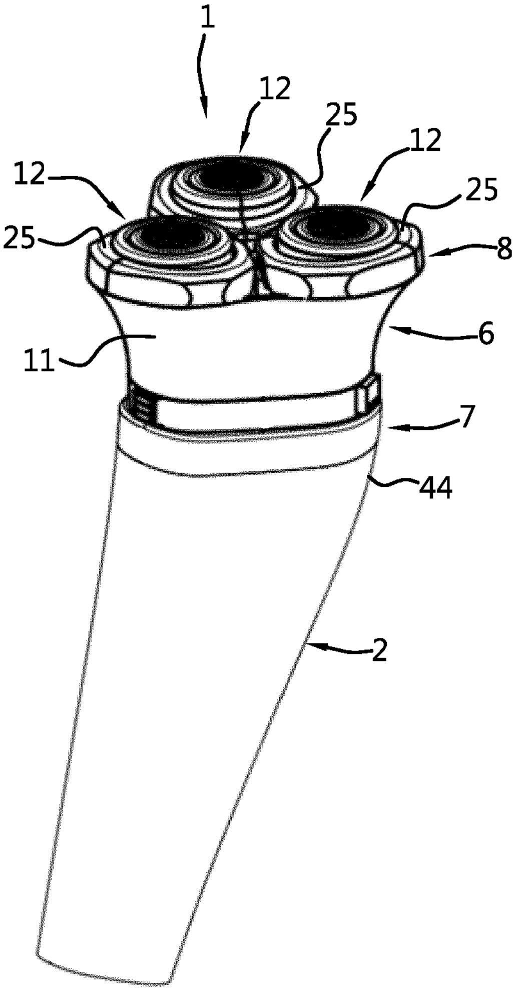
FIG. 1A is a perspective view of a first example of a shaving apparatus in accordance with the invention.

A first example of a shaving apparatus 1 according to the invention is shown in FIGS. 1A, 1B, 2-5, 6A, 6B, 7A and 7B.

The having apparatus 1 has a main housing 2 accommodating a motor 3, a rechargeable battery 4 and a driving output member 5 in the form of a pinion wheel coupled to the motor 3. Electrical circuitry connecting the battery 4 to the motor 3 is not shown. The shaving apparatus 1 further has a shaving unit 6 composed of a first shaving unit portion 7 and a second shaving unit portion 8. The first shaving unit portion 7 is connected to the main housing 2 in a stationary position relative to the main housing 2 and accommodates a single driven input member 9 which is connected to the driving output member 5 via a drive shaft 14 and a gear wheel 15 rotationally fixed to the drive shaft 14. The driven input member 9 is rotationally suspended in the first shaving unit portion 7, and the drive shaft 14 and the gear wheel 15 are rotationally suspended in the main housing 2 such that the driven input member 9, the drive shaft 14 and the gear wheel 15 are rotatable about a common axis of rotation 10. The second shaving unit portion 8 has a support structure 11, three hair-cutting units 12 supported by the support structure 11, and a drive unit 13 connected to the single driven input member 9 and to each of the hair-cutting units 12. The hair-cutting units 12 each include an external cutting member 18 with hair-entry apertures and an internal cutting member 19 which is rotatable relative to the external cutting member 18 of the respective shaving unit 12 so that cutting edges of the internal cutting member 19 slide along an internal surface of the external cutting member 18 in which the hair-entry apertures are provided. The external cutting members 18 each project through an opening 42 provided in a skin-supporting surface 25 of the respective hair-cutting unit 12 surrounding the external cutting member 18.

Figure 5:
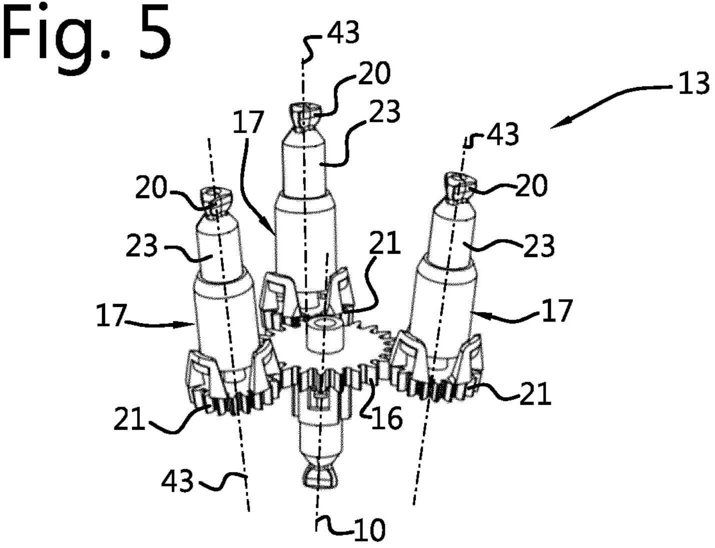
FIG. 5 is a perspective view of a drive unit of the shaving apparatus shown in FIGS. 1A, 1B, 2, 3 and 4.
Figure 6A:
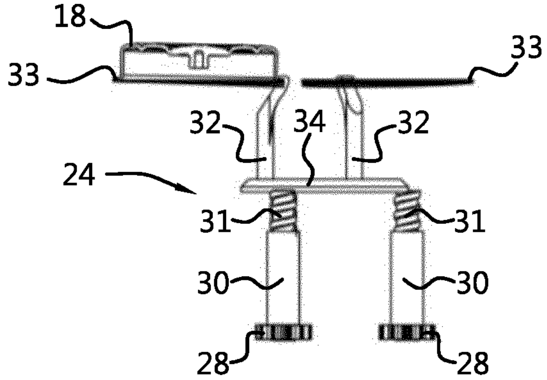
FIG. 6A is a side view of a portion of an adjustment system of the shaving apparatus shown in FIGS. 1A, 1B, 2, 3, 4 and 5.

As is best seen in FIG. 5, the drive unit 13 has a central gear wheel 16 in toothed engagement with three pinion wheels 21. The central gear wheel 16 is coupled to the single driven input member 9. Each of the pinion wheels 21 is coupled to a respective one of three drive members 17 of the hair-cutting units 12. The drive members 17 each have a coupling head 20 coupled to a respective one of the internal cutting members 19 of the hair-cutting units 12. The drive unit 13 is thus arranged to transmit a driving force from the single driven input member 9 to each of the internal cutting members 19. The drive members 17 are each provided with a spring 22 (see FIG. 4) for telescopically urging a distal drive member portion 23, which includes the coupling head 20 of the respective drive member 17, in axial direction towards the external cutting member 18 of the respective hair-cutting unit 12. Thus, the internal cutting member 19 of each hair-cutting unit 12 is biased against the internal surface of the external cutting member 18 of the respective hair-cutting unit 12, so that the external cutting member 18 is biased outwardly by the internal cutting member 19. During shaving, the external cutting members 18 are pressed inwardly against the biasing force exerted by the internal cutting members 19. The external cutting members 18 project relative to the skin-supporting surfaces 25 of the hair-cutting units 12. In view of the elastic deformability of a skin surface being shaved, the distance over which the external cutting members 18 project relative to the external skin-supporting surfaces 25 of the hair-cutting units 12 influences the effective normal pressure at which the external cutting members 18 are pressed against the skin during shaving.

The shaving apparatus 1 further has an adjustment system 24 configured to adjust an operational parameter of the shaving apparatus 1. In this example, the adjustable operational parameter of the shaving apparatus 1 is the effective pressure at which the external cutting members 18 are pressed against the skin during shaving.

Figure 1B:
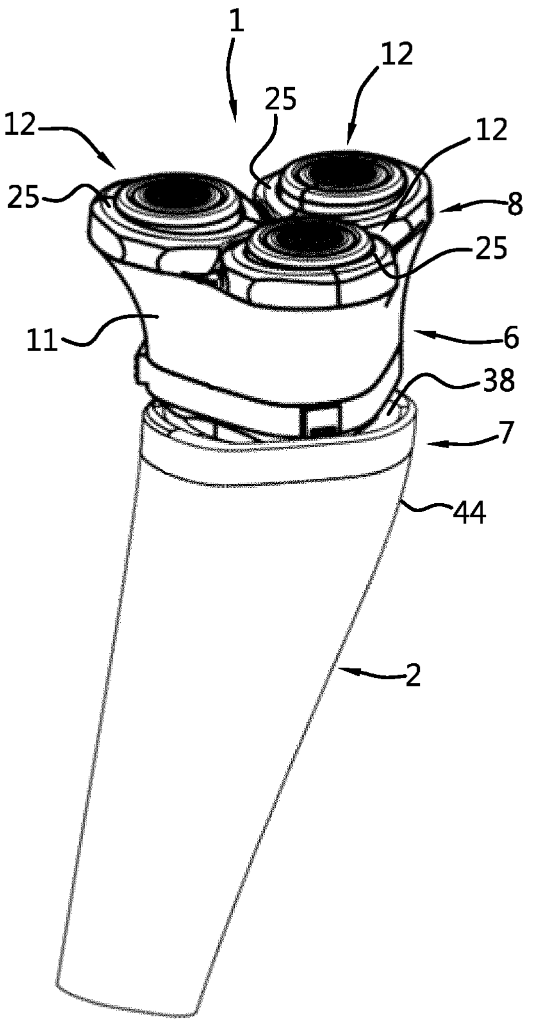
FIG. 1B is a perspective view of the shaving apparatus shown in FIG. 1A with a shaving unit portion in a rotational position between two positions associated with different settings of an operational parameter of the shaving apparatus.
Figure 2:
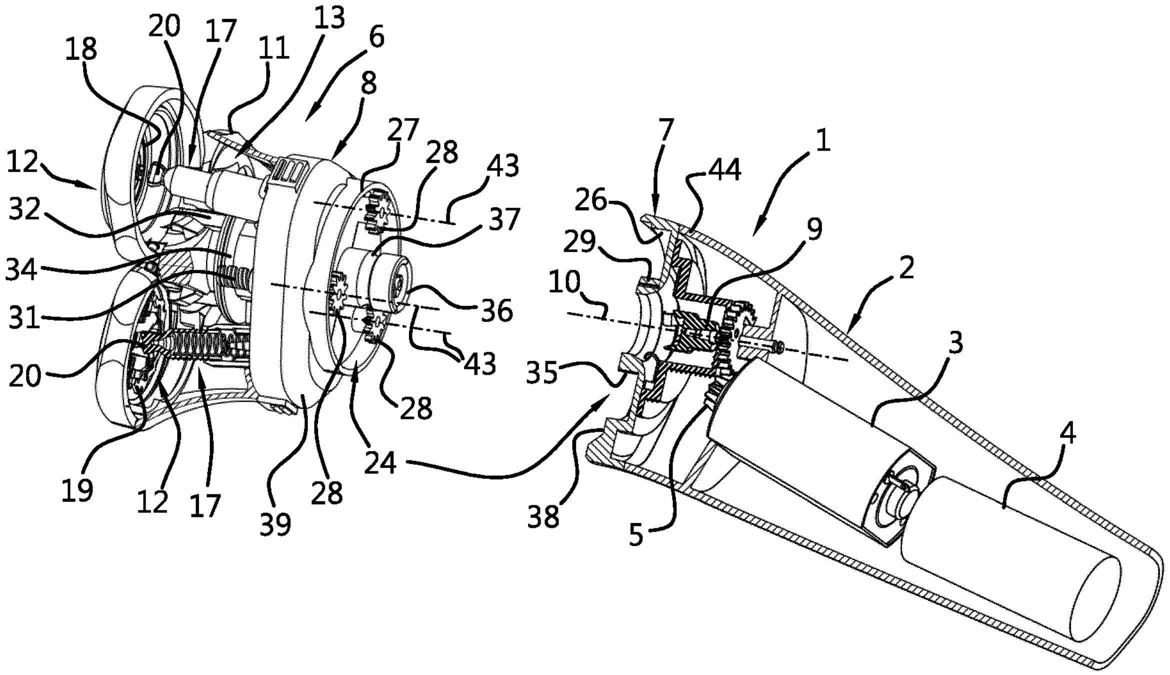
FIG. 2 is an exploded, partially cut-away perspective view of the shaving apparatus shown in FIGS. 1A and 1B.
Figure 3:
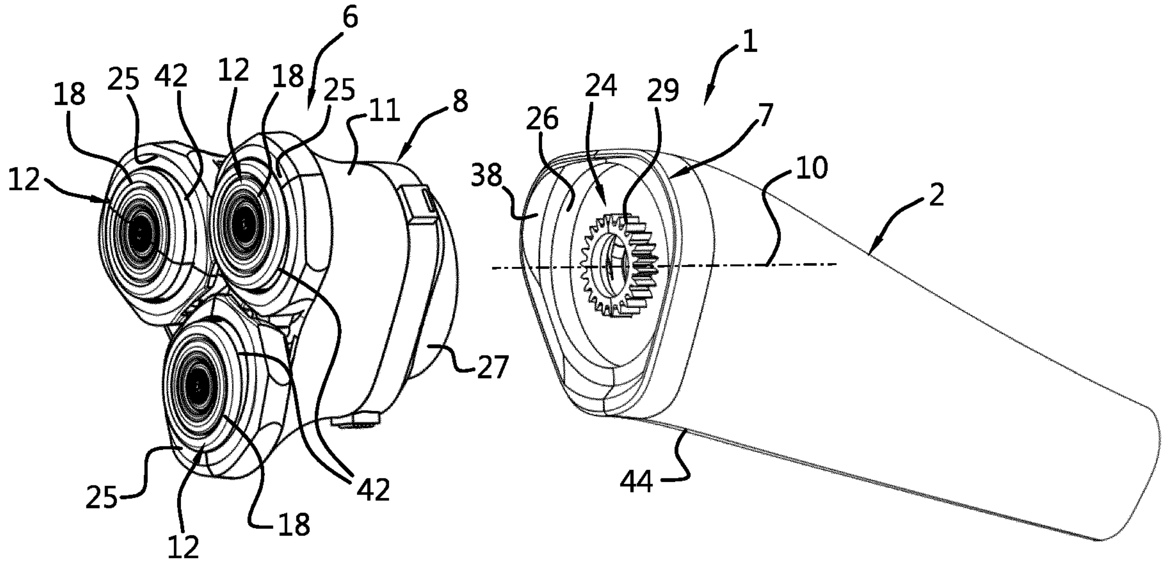
FIG. 3 is a perspective view of the shaving apparatus shown in FIGS. 1A, 1B and 2 with the shaving unit portion detached from the housing.
Figure 4:
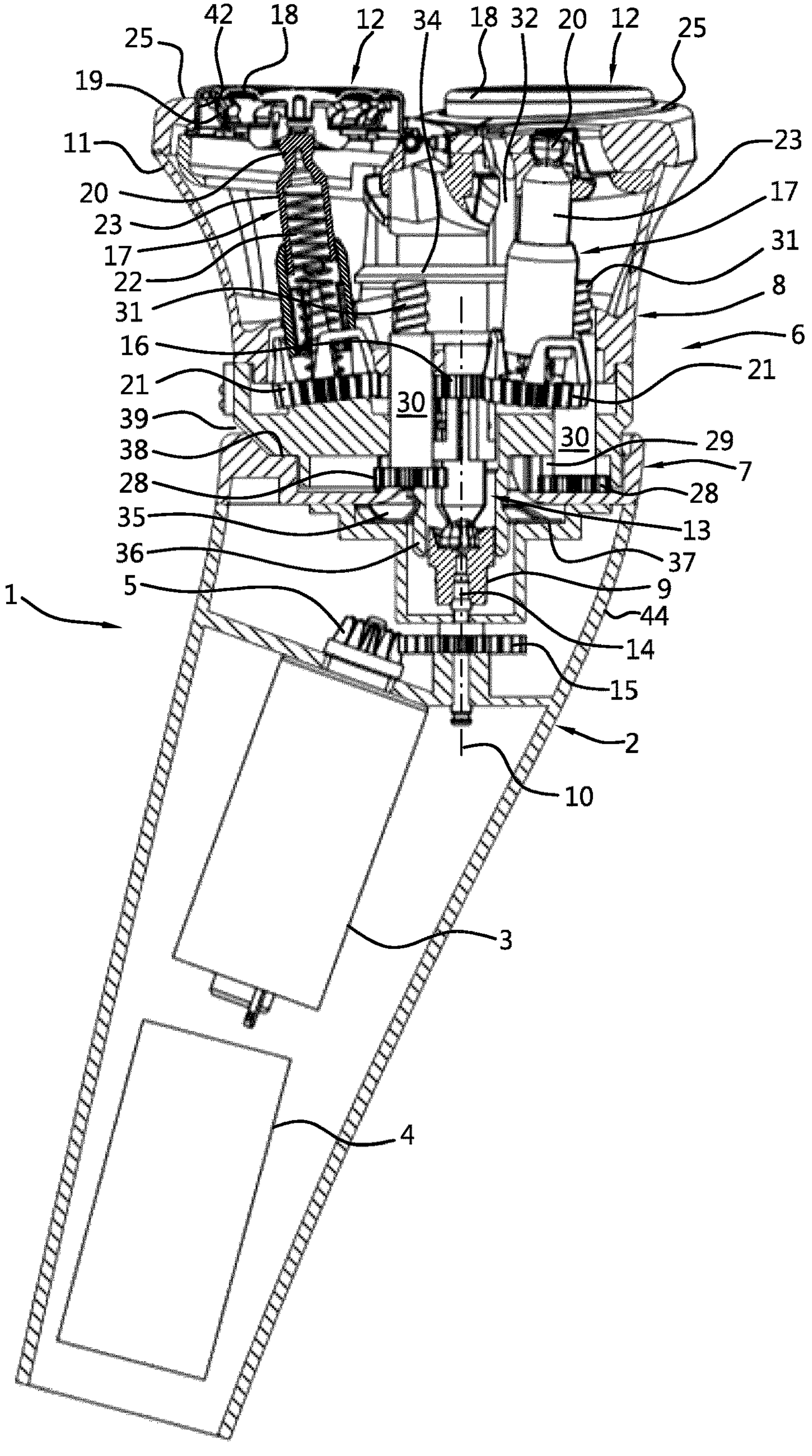
FIG. 4 is a cross-sectional view of the shaving apparatus shown in FIGS. 1A, 1B, 2 and 3.

For setting the operational parameter, the first and the second shaving unit portions 7, 8 are mutually connected by means of a connection mechanism 26, 27 which is configured to allow manual rotation of the second shaving unit portion 8 relative to the first shaving unit portion 7 about a rotational axis coinciding with the axis of rotation 10 of the single driven input member 9, as is best seen in FIGS. 1A, 1B and 3.

According to the invention, the adjustment system 24 generally includes a sensing unit which is configured to have an output property which varies in dependence on an angular position of the second shaving unit portion 8 relative to the first shaving unit portion 7 about the rotational axis 10. In the present example, the sensing unit is of a mechanical type and is formed by a set of planetary pinion wheels 28 in toothed engagement with a stationary toothed rack 29. The toothed rack 29 is a first gear wheel of the sensing unit which is arranged in a fixed position relative to the first shaving unit portion 7 and extends along a circle concentrically about the rotational axis 10. The planetary pinion wheels 28 each constitute a second gear wheel of the sensing unit which is arranged in the second shaving unit portion 8 and is rotatable relative to the support structure 11 about a gear wheel axis 43 extending parallel to the rotational axis 10. If the second shaving unit portion 8 is manually rotated relative to the first shaving unit portion 7 about the rotational axis 10, the planetary pinion wheels 28 are rotated about the respective gear wheel axes 43 by their engagement with the toothed rack 29. The adjustment system 24 is configured to adjust the operational parameter of the shaving apparatus 1 in dependence on the output property of the sensing unit. In the present example, the output property of the sensing unit may be considered as the rotational positions of the pinion wheels 28 about the gear wheel axes 43 and/or the number of rotations of the pinion wheels 28 about the gear wheel axes 43. In the present example, rotations of the pinion wheels 28 about the gear wheel axes 43 result in an adjustment of the operational parameter. For this purpose, rotations of the pinion wheels 28 are converted into axial displacements of parts of the adjustment system 24 by helical transfer mechanisms each coupled to a respective one of the planetary pinion wheels 28. The helical transfer mechanisms each comprise an internally threaded bush member 30 and an externally threaded shaft member 31 in threaded engagement with the internally threaded bush member 30. Rotation of the bush members 30 relative to the shaft members 31 about the gear wheel axes 43, driven by the planetary pinion wheels 28, causes the shaft members 31 to move axially relative to the gear wheel axes 43. For this purpose, the shaft members 31 are prevented to rotate about the gear wheel axes 43 in a manner described hereinafter. This axial movement of the shaft members 31 is used for adjusting the operational parameter. It is noted that the internally and externally threaded members could also be reversed, i.e. by rotational fixation of the planetary pinion wheels 28 to the externally threaded shaft members and by causing the internally threaded bush members to move axially if the externally threaded shaft member is rotated.

In the present example, adjustable hooks 32 are coupled to the axially movable shaft members 31 via a coupling ring 34. The coupling ring 34 is displaceably guided relative to the support structure 11 in a direction parallel to the gear wheel axes 43, and the shaft members 31 are fixedly connected to the coupling ring 34 to prevent rotation of the shaft members 31 about the gear wheel axes 43. The hooks 32 each limit outward movability of a respective one of the external cutting members 18 by engaging an annular flange 33 thereof. By limiting external movability of the external cutting members 18, the axial distance over which the external cutting members 18 project relative to the skin-supporting surfaces 25 and the normal pressure exerted during shaving are reduced. Thereby, the shaving result is influenced.

Because the adjustment system 24 is operable by manually rotating the second shaving unit portion 8 relative to the first shaving unit portion 7 and the main housing 2 about a rotational axis coinciding with the axis of rotation 10 of the single driven input member 9, the operational parameter of the shaving apparatus 1 can be adjusted without interfering with the functionality of the drive train from the motor 3 to the internal cutting members 19. Since the shaving unit 6 is a distinct unit separate from the main housing 2, and rotation of the second shaving unit portion 8 relative to the first shaving unit portion 7 and the main housing 2 is provided about an axis coinciding with the axis of rotation 10 of the single driven input member 9, setting of the operational parameter of the shaving apparatus 1 is allowed without requiring, for this purpose, an additional seam in the main housing 2 or an operating member such as a switch.

Such operation of the adjustment system is of particular advantage in a shaving apparatus in which, as in the present example, the second shaving unit portion 8 includes at least two hair-cutting units 12 supported by the support structure 11, in which the hair-cutting units 12 each include an external cutting member 18 with hair-entry apertures and an internal cutting member 19 which is rotatable relative to the external cutting member 18, and in which the drive unit 13 is arranged to transmit the driving force from the single driven input member 9 at least partially to the internal cutting member 19 of each of the at least two hair-cutting units 18, because the rotation for adjustment of the adjustment system is a rotation about the axis of rotation 10 of the single driven input member 9 via which all internal cutting members 19 are driven. It is also possible to provide the shaving unit with only one hair-cutting unit or a number of hair-cutting units other than three (as in the present example).

For influencing the shaving result, the adjustable operational parameter can alternatively be a maximum projection distance of at least a portion of the external cutting members 18 relative to the skin-supporting surfaces 25.

Such a maximum projection distance can for instance be adjusted by means of abutments, in this example each formed by one of the hooks 32, limiting the maximum projection distance, positions of the abutments being adjustable for adjusting the maximum projection distance.

The sensing unit is provided in a simple manner and can also drive the adjustment system 24, because the sensing unit includes a first gear wheel, in the example shown the toothed rack 29, which is arranged in a fixed position relative to the first shaving unit portion 7 and concentrically about the rotational axis 10, and a second gear wheel, i.e. the planetary pinion wheel 28, which is arranged in the second shaving unit portion 8, is rotatable relative to the support structure 11 about a gear wheel axis 43 extending parallel to the rotational axis 10, and engages the first gear wheel, while the second gear wheel is arranged in the adjustment system such that rotation of the second gear wheel about the gear wheel axis 43 results in an adjustment of the operational parameter.

This can be implemented in a simple manner for influencing the shaving result by providing that the operational parameter is a position of a part, in the example shown the external cutting member 18 of the or each of the hair-cutting units 12, wherein the adjustment system 24 has a conversion mechanism, in the example shown comprising the internally threaded bush member 30 rotationally coupled to the pinion wheel and the externally threaded shaft member 31 in engagement with the or each hair-cutting unit 12 for converting rotation about a center line of the conversion mechanism into linear motion of said part of the or each hair-cutting unit 12.

For providing a limited number of predefined settings of the adjustable operational parameter and for avoiding accidental changes of the setting, the adjustment system 24 includes an indexing mechanism 35, 36, 37, 38 for positioning the second shaving unit portion 8 relative to the first shaving unit portion 7 in any of at least n indexed positions mutually rotated about the axis of rotation 10, wherein n is a natural number and at least 2. In the present example, the indexing mechanism has been implemented by providing the first shaving unit portion 7 with a spring 35 engaging an annular recess 37 with axially sloping surfaces provided in a central bushing 36 of the second shaving unit portion 8 concentrically arranged relative to the axis of rotation 10. Furthermore, a side of the first shaving unit portion 7 facing the second shaving unit portion 8 is formed as a generally triangular recess 38, and a side of the second shaving unit portion 8 facing the first shaving unit portion 7 is formed as a generally triangular protrusion 39 and has three positions in which it fits most deeply in the recess 38. By engaging the recess 37, the spring 35 urges the second shaving unit portion 8 into engagement with the first shaving unit portion 7, thereby also urging the second shaving unit portion 8 towards a nearest of three indexed positions.

To cause a user to intuitively set the adjustable operational parameter in one of the predefined settings, an end portion 44 of the main housing 2 facing the second shaving unit portion 8 and the second shaving unit portion 8 have similar contours of an at least n-fold rotational symmetry, wherein n is a natural number and at least 2, and the contours of the second shaving unit portion 8 and of the end portion 44 of the main housing 2 facing the second shaving unit portion 8 are in mutually best matching orientations when the second shaving unit portion 8 is in any of the n indexing positions relative to the first shaving unit portion. In the present example, this has been implemented by providing that the end portion 44 of the main housing 2 facing the second shaving unit portion 8 and the second shaving unit portion 8 have similar generally triangular contours, i.e. are of a threefold rotational symmetry.

The second shaving unit portion 8 is releasably coupled to the first shaving unit portion 7 and the drive unit 13 is releasably coupled to the single driven input member 13. This allows the second shaving unit portion 8 to be dismounted from the shaving apparatus 1 and to be remounted thereto quickly and easily. The second shaving unit portion 8 may for example be replaced by a different functional unit, for example a rotatable skin cleansing brush or a long hair trimming unit. In the present example, the second shaving unit portion 8 is held snapped in place in axial direction of the axis of rotation 10 by the spring 35 of the first shaving unit portion 7 engaging the recess 37 in the bushing 36 of the second shaving unit portion 8. Alternatively, the first shaving unit portion 7 may be releasably coupled to the main housing 2, and the single driven input member 9 may be releasably coupled to the drive shaft 14. In this embodiment, the shaving unit 6 as a whole can be decoupled from and coupled to the main housing 2.

Figure 7A:
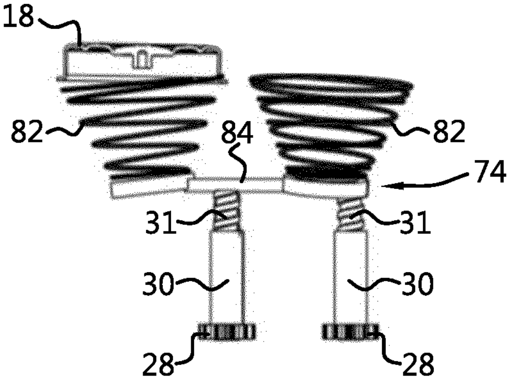
FIG. 7A is a side view of a portion of an adjustment system of s second example of a shaving apparatus according to the invention.
Figure 6B:
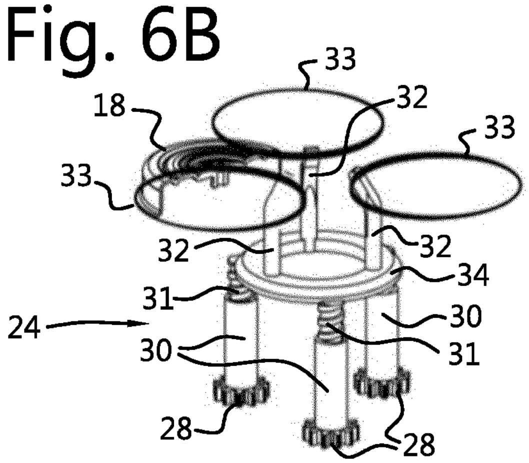
FIG. 6B is a perspective view of the portion of the adjustment system shown in FIG. 6A.
Figure 7B:
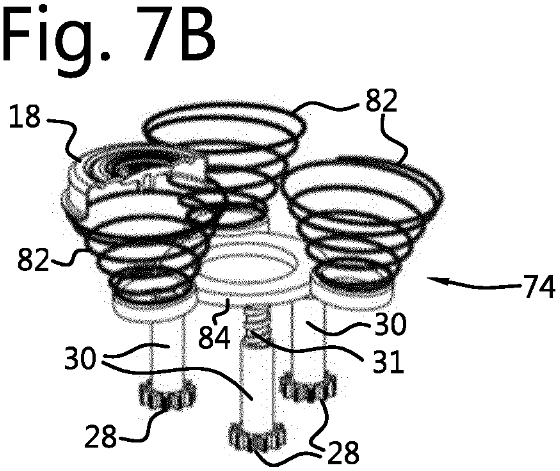
FIG. 7B is a perspective view of the portion of the adjustment system shown in FIG. 7A.

In FIGS. 7A and 7B, an adjustment system 74 of a second example of a shaving apparatus according to the invention is shown. Parts and portions that are identical to corresponding parts and portions of the shaving apparatus according to the first example described here before are designated by the same reference numbers as used for the corresponding parts and portions of the shaving apparatus according to the first example.

In the second example, the operational parameter adjustable by the adjustment system 74 is a biasing force of resilient elements 82, which are arranged in the second shaving unit portion 8 for urging the external cutting members 18 outwardly. Thus, the force required for pressing the external cutting members 18 inwardly is adjustable, and thereby the shaving result is influenced.

For adjusting said biasing force, the second shaving unit portion 8 is provided with a support member 84. The resilient elements 82 are compressed between the support member 84 and the external cutting members 18, and the annular flanges 33 of the external cutting members 18 are urged against surrounding supporting rims that are provided with the skin-supporting surfaces 25. The position of the support member 84 is adjustable in a direction parallel to the rotational axis 10 for adjusting the biasing force of the resilient elements 82. In the present example, this has been implemented by providing helical springs 82 each being compressed between the support member 84 and one of the external cutting members 18. The position of the support member 84 is adjustable towards and away from the external cutting members 18 by rotation of the planetary pinion wheels 28 and the internally threaded bush members 30 connected thereto, which causes the externally threaded shaft members 31, which are fixed to the support member 84, to move axially towards or away from the cutting members 18.

The external cutting members 18 are each suspended relative to the support structure 11 for allowing the external cutting member 18 to be at least partially displaced relative to the skin-supporting surface 25 by shaving pressure having a directional component opposite to the biasing force exerted by the associated one of the resilient elements 82. The force required for pressing the external cutting members 18 fully into a position in which the upper surfaces of the external cutting members 18 is flush with the adjacent portions of the associated skin-supporting surface 25 determines the maximum shaving pressure that can be exerted. This force is adjustable by adjusting the position of the support member 84 towards and away from the external cutting members 18.

Figure 8:
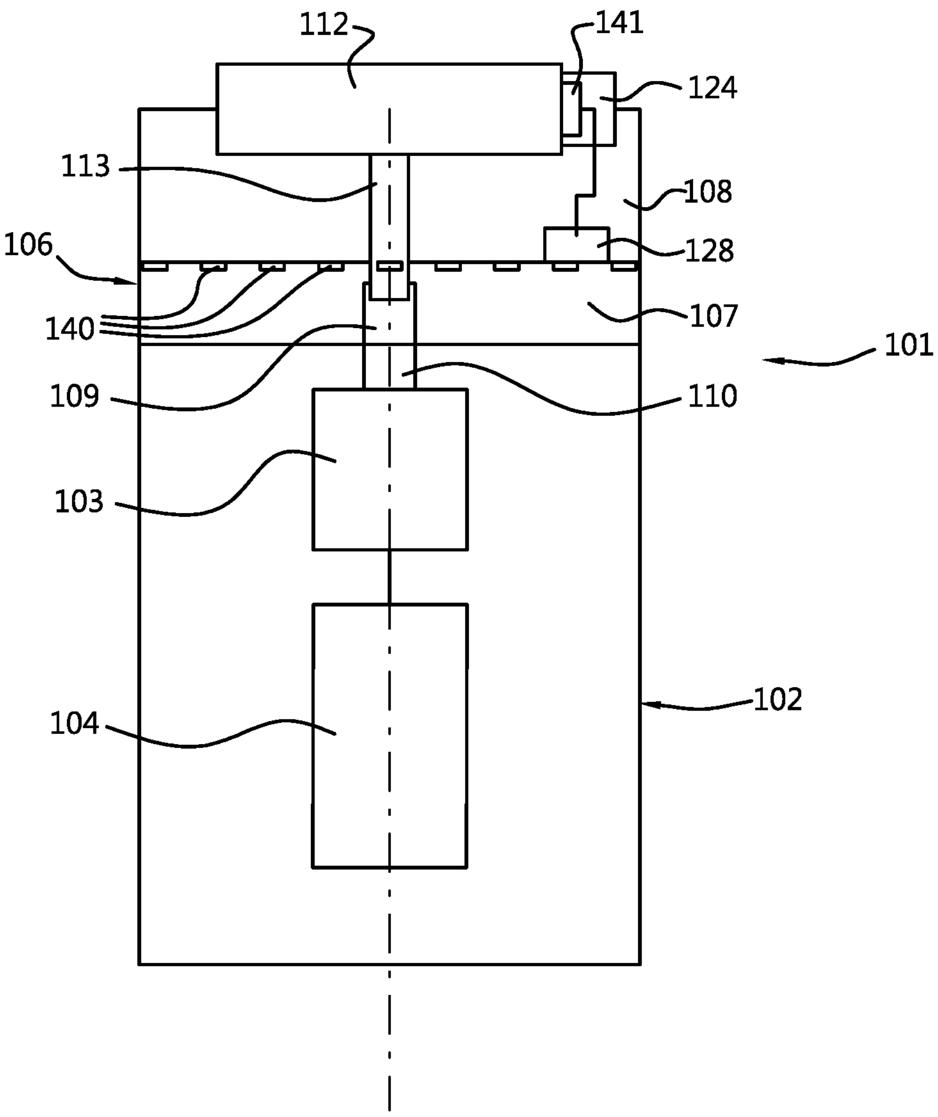
FIG. 8 is a schematic representation of a third example of a shaving apparatus according to the invention.

In FIG. 8, a third example of a shaving apparatus 101 according to the invention is shown. The shaving apparatus 101 has a motor 103 and a rechargeable battery 104 accommodated in a main housing 102. At one end of the main housing 102, a shaving unit 106 comprising a first shaving unit portion 107 and a second shaving unit portion 108 is provided.

The second shaving unit portion 108 has a hair-cutting unit 112 and a drive unit 113 coupled to an internal cutting member (not shown) of the hair-cutting unit 112 for driving movement of the internal cutting member. The first shaving unit portion 107 has a single driven input member 109 coupled to the motor 103 and to the drive unit 113. Thus, rotation of the motor 103 will drive movement of the internal cutting member via the single driven input member 109 and the drive unit 113. The single driven input member 109 and the drive unit 113 are rotatable about an axis of rotation 110. Like the second shaving unit portion 8 in the first and second examples of the shaving apparatus 1 according to the invention as described here before, the second shaving unit portion 108 is manually rotatable relative to the first shaving unit portion 109 about the axis of rotation 110. As in the first and second examples of the invention, by application of an adjustment system 124 manual rotation of the second shaving unit portion 108 results in an adjustment of an operational parameter of the shaving apparatus 101 in dependence on an angular position of the second shaving unit portion 108 relative to the first shaving unit portion 107 about the axis of rotation 110. Whereas in the first and second examples of the invention the sensing unit, configured to have an output property which varies in dependence on an angular position of the second shaving unit portion 8 relative to the first shaving unit portion 7, is of a mechanical type, the adjustment system 124 includes a sensing unit of an electronic type including a sensor 128 configured to measure the angular position of the second shaving unit portion 108 relative to the first shaving unit portion 107 about the rotational axis 110. The adjustment system 124 further includes an electrical controller 141 configured to receive an output signal of the sensor 128 and to adjust the operational parameter based on the output signal. Thus, in this example the output property of the sensing unit may be considered as the output signal of the sensor 128. This embodiment allows to adjust a wide variety of operational parameters and to define the relationship between the rotational position of the second shaving unit portion 108 and the value of the operational parameter as desired. Examples of such operational parameters are the speed of the motor 103, the on-off status of the shaving apparatus 101, or the contents of an information display provided on the main housing 102. The controller 141 may also activate and control, in dependence on the output signal of the sensor 128, one or more electrical actuators that can effect, instead of the planetary pinion wheels 28, adjustment of the operational parameters as described here before in relation to the first and second examples of the invention. For detecting the rotational position of the second shaving unit portion 108, the first shaving unit portion 107 is provided with a number of encoder elements 140 evenly distributed in rotational sense along a trajectory of the sensor 128 along the first shaving unit portion 107 when the second shaving unit portion 108 is rotated relative to the first shaving unit portion 107.

Several features have been described as part of the embodiments shown in the drawings or of other embodiments of the invention. However, it will be appreciated that the scope of the invention also includes embodiments having combinations of all or some of these features other than the specific combinations of features of the examples.

The invention claimed is:

1. A shaving apparatus comprising:

a main housing accommodating a motor and a driving output member coupled to the motor;

a shaving unit comprising a first shaving unit portion and a second shaving unit portion; and an adjustment system configured to adjust an operational parameter of the shaving apparatus;

wherein:

the first shaving unit portion is connected to the main housing in a stationary position relative to the main housing and accommodates a single driven input member which is connected to the driving output member and rotatable about an axis of rotation, the second shaving unit portion comprises a support structure, at least one hair-cutting unit supported by the support structure, and a drive unit connected to the single driven input member and to the hair-cutting unit, wherein the hair-cutting unit comprises an external cutting member with hair-entry apertures and an internal cutting member which is movable relative to the external cutting member, and wherein the drive unit is arranged to transmit a driving force from the single driven input member to the internal cutting member, the first and the second shaving unit portions are mutually connected via a connection, which is configured to allow manual rotation of the second shaving unit portion relative to the first shaving unit portion about a rotational axis coinciding with the axis of rotation of the single driven input member, the adjustment system comprises a sensing unit which is configured to have an output property which varies in dependence on an angular position of the second shaving unit portion relative to the first shaving unit portion about the rotational axis, and the adjustment system is configured to adjust the operational parameter in dependence on the output property of the sensing unit.

2. The shaving apparatus as claimed in claim 1, wherein the second shaving unit portion is releasably coupled to the first shaving unit portion, and wherein the drive unit is releasably coupled to the single driven input member.

3. The shaving apparatus as claimed in claim 1, wherein the second shaving unit portion comprises at least two hair-cutting units supported by the support structure, wherein the hair-cutting units each comprise an external cutting member with hair-entry apertures and an internal cutting member which is rotatable relative to the external cutting member, and wherein the drive unit is arranged to transmit the driving force from the single driven input member at least partially to the internal cutting member of each of the at least two hair-cutting units.

4. The shaving apparatus as claimed in claim 1, wherein the sensing unit comprises:

a first gear wheel which is arranged in a fixed position relative to the first shaving unit portion and concentrically about the rotational axis; and a second gear wheel which is arranged in the second shaving unit portion, is rotatable relative to the support structure about a gear wheel axis extending parallel to the rotational axis, and engages the first gear wheel;

wherein the second gear wheel is arranged in the adjustment system such that rotation of the second gear wheel about the gear wheel axis results in an adjustment of the operational parameter.

5. The shaving apparatus as claimed in claim 4, wherein the operational parameter is a position of a part of the hair-cutting unit, wherein the adjustment system has a conversion mechanism rotationally coupled to the second gear wheel and in engagement with the or each hair-cutting unit for converting rotation about a center line of the conversion mechanism into linear motion of said part of the hair-cutting unit.

6. A shaving apparatus as claimed in claim 5, wherein the second shaving unit portion further comprises a skin-supporting surface with an opening through which the external cutting member projects, and wherein said adjustable operational parameter is a maximum projection distance of at least a portion of the external cutting member relative the skin-supporting surface.

7. The shaving apparatus as claimed in claim 4, wherein the operational parameter adjustable by the adjustment system is a biasing force of resilient elements urging the external cutting member outwardly.

8. The shaving apparatus as claimed in claim 7, wherein the second shaving unit portion further comprises a skin-supporting surface with an opening through which the external cutting member projects, and wherein the external cutting member is suspended relative to the support structure for allowing the external cutting member to be at least partially displaced relative to the skin-supporting surface by shaving pressure having a directional component opposite to the biasing force.

9. The shaving apparatus as claimed in claim 7, wherein the second shaving unit portion further comprises a support member, the resilient elements being compressed between the support member and the external cutting members, and wherein a position of said support member in a direction parallel to the rotational axis is adjustable by the adjustment system for adjusting said biasing force of the resilient elements.

10. The shaving apparatus as claimed in claim 1, wherein the adjustment system includes an indexing mechanism for positioning the second shaving unit portion relative to the first shaving unit portion in any of at least n indexed positions mutually rotated about said axis of rotation, wherein n is a natural number and at least 2.

11. The shaving apparatus as claimed in claim 1, wherein an end portion of the main housing facing the second shaving unit portion and the second shaving unit portion have similar contours of an at least n-fold rotational symmetry, wherein n is a natural number and at least 2, and wherein said contours of the second shaving unit portion and of said end portion of the main housing facing said second shaving unit portion are in mutually best matching orientations when the second shaving unit portion is in any of said n indexing positions relative to the first shaving unit portion.

* * * * *